US012715220B2

(12) United States Patent
Otani et al.

(10) Patent No.: US 12,715,220 B2
(45) Date of Patent: Aug. 25, 2026

(54) CARTRIDGE AND RE-MANUFACTURING METHOD OF CARTRIDGE

(71) Applicant: CANON KABUSHIKI KAISHA, Tokyo (JP)

(72) Inventors: Isao Otani, Kanagawa (JP); Junichiro Iri, Kanagawa (JP); Yusuke Hashimoto, Kanagawa (JP); Masatoshi Ohira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 18/630,849

(22) Filed: Apr. 9, 2024

(65) Prior Publication Data

US 2024/0343040 A1 Oct. 17, 2024

(30) Foreign Application Priority Data

Apr. 14, 2023 (JP) ................................ 2023-066450
Mar. 7, 2024 (JP) ................................ 2024-034595

(51) Int. Cl.
*B41J 2/175* (2006.01)

(52) U.S. Cl.
CPC ....... *B41J 2/17513* (2013.01); *B41J 2/17553* (2013.01)

(58) Field of Classification Search
CPC .... B41J 2/175; B41J 2/17503; B41J 2/17506; B41J 2/17513; B41J 2/1752; B41J 2/17523; B41J 2/1754; B41J 2/17553; B41J 2/17559
See application file for complete search history.

(56) References Cited

U.S. PATENT DOCUMENTS

| | | | | |
|---|---|---|---|---|
| 6,070,976 A * | 6/2000 | Takagi | B41J 2/1752 | 347/86 |
| 6,247,804 B1 * | 6/2001 | Watanabe | B41M 5/0017 | 347/101 |
| 6,899,417 B1 * | 5/2005 | Shinada | B41J 2/17513 | 347/86 |
| 7,387,379 B2 * | 6/2008 | Nanjo | B41J 2/17513 | 347/86 |
| 2001/0048457 A1 * | 12/2001 | Hara | B41J 2/17513 | 347/86 |

FOREIGN PATENT DOCUMENTS

| | | |
|---|---|---|
| JP | 2005067076 A | 3/2005 |
| JP | 2006044230 A | 2/2006 |

* cited by examiner

*Primary Examiner* — Anh T Vo
(74) *Attorney, Agent, or Firm* — Canon U.S.A., Inc. IP Division

(57) ABSTRACT

A cartridge includes a liquid absorbent, a tank, and a partition member. The liquid absorbent holds liquid. The tank has an opening and an absorbent holder to store the liquid absorbent. The lid member is joined to the opening of the tank. The partition member is arranged between the liquid absorbent positioned inside the absorbent holder and the lid member. The lid member includes a plurality of protrusion portions, and the partition member is gripped by the plurality of protrusion portions.

5 Claims, 15 Drawing Sheets

CARTRIDGE AND RE-MANUFACTURING METHOD OF CARTRIDGE

BACKGROUND

Field

The present disclosure relates to a cartridge and a re-manufacturing method of the cartridge.

Description of the Related Art

In recent years, the restrictions for the purpose of environmental conservation have been increasing, and it has been required for a printing device to correspond to a recyclable product. Japanese Patent Laid-Open No. 2006-44230 (hereinafter, referred to as PTL 1) discloses a manufacturing method in which, in welding and joining synthetic resin members that are an ink tank and a lid member thereof, a welding rib is formed on a welding surface of one member, and the welding rib is melted and heated by heating caused by longitudinal vibration so as to join the welding surfaces of the two members.

In a case where the ink tank and the lid are fixed to each other by welding as described in PTL 1, the welding surfaces of the ink tank and the lid are both melted and deformed; for this reason, it is difficult to disassemble the ink tank and the lid for recycling after the use of a cartridge.

SUMMARY

According to an aspect of the present disclosure, a cartridge includes a liquid absorbent configured to hold liquid, a tank having an opening and an absorbent holder to store the liquid absorbent, a lid member joined to the opening of the tank, and a partition member arranged between the liquid absorbent positioned inside the absorbent holder and the lid member, wherein the lid member includes a plurality of protrusion portions, and the partition member is gripped by the plurality of protrusion portions.

Further features of the present disclosure will become apparent from the following description of exemplary embodiments with reference to the attached drawings.

DESCRIPTION OF THE EMBODIMENTS

Embodiments of the present disclosure are described below in detail with reference to the drawings.

First Embodiment (Ink Jet Printing Apparatus Overview)

Figure 1:
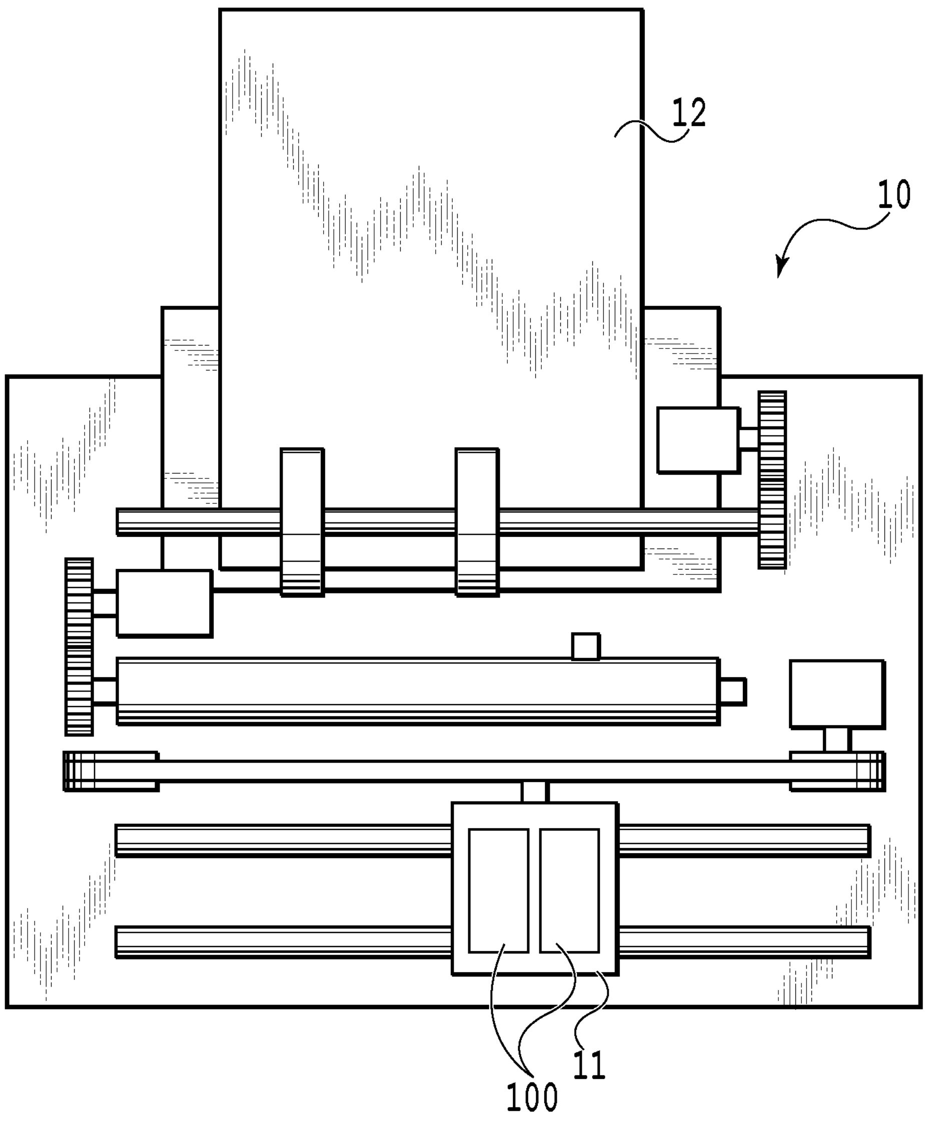
FIG. 1 is a schematic view of a printing apparatus in which a cartridge of the present disclosure can be used.

FIG. 1 illustrates a schematic view of an ink jet printing apparatus according to a first embodiment. An ink jet printing apparatus 10 (hereinafter, also referred to as a printing apparatus) is an on-carriage type of a serial printing type and includes a cartridge 100 and a carriage 11. The cartridge 100 is mounted on the carriage 11. In the printing apparatus 10, the carriage 11 reciprocates, printing paper 12 is conveyed by a predetermined amount in a direction orthogonal to the reciprocation of the carriage, and with the cartridge ejecting ink onto the printing paper 12, an image is formed on the printing paper 12.

(Cartridge Overview)

Figure 2:
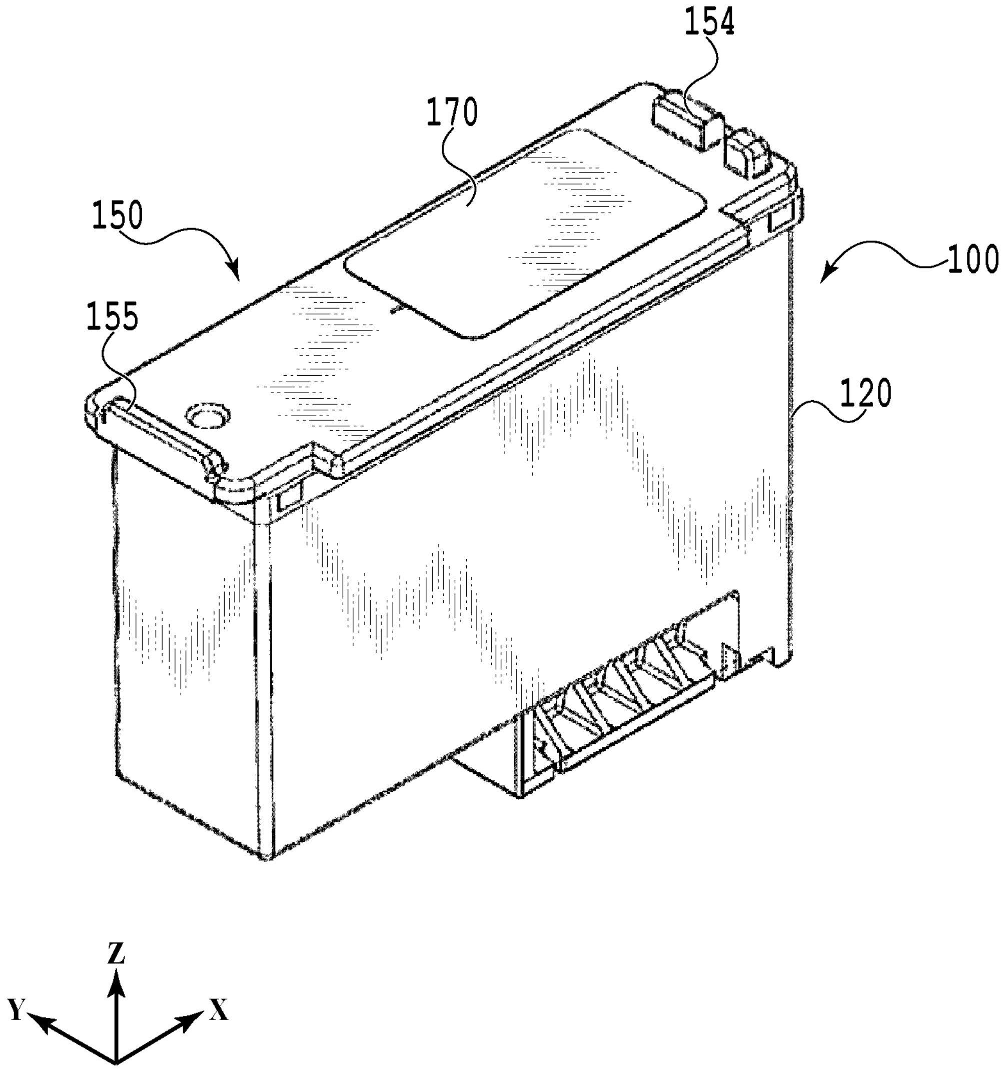
FIG. 2 is a perspective view illustrating an exterior of the cartridge according to a first embodiment.
Figure 3:
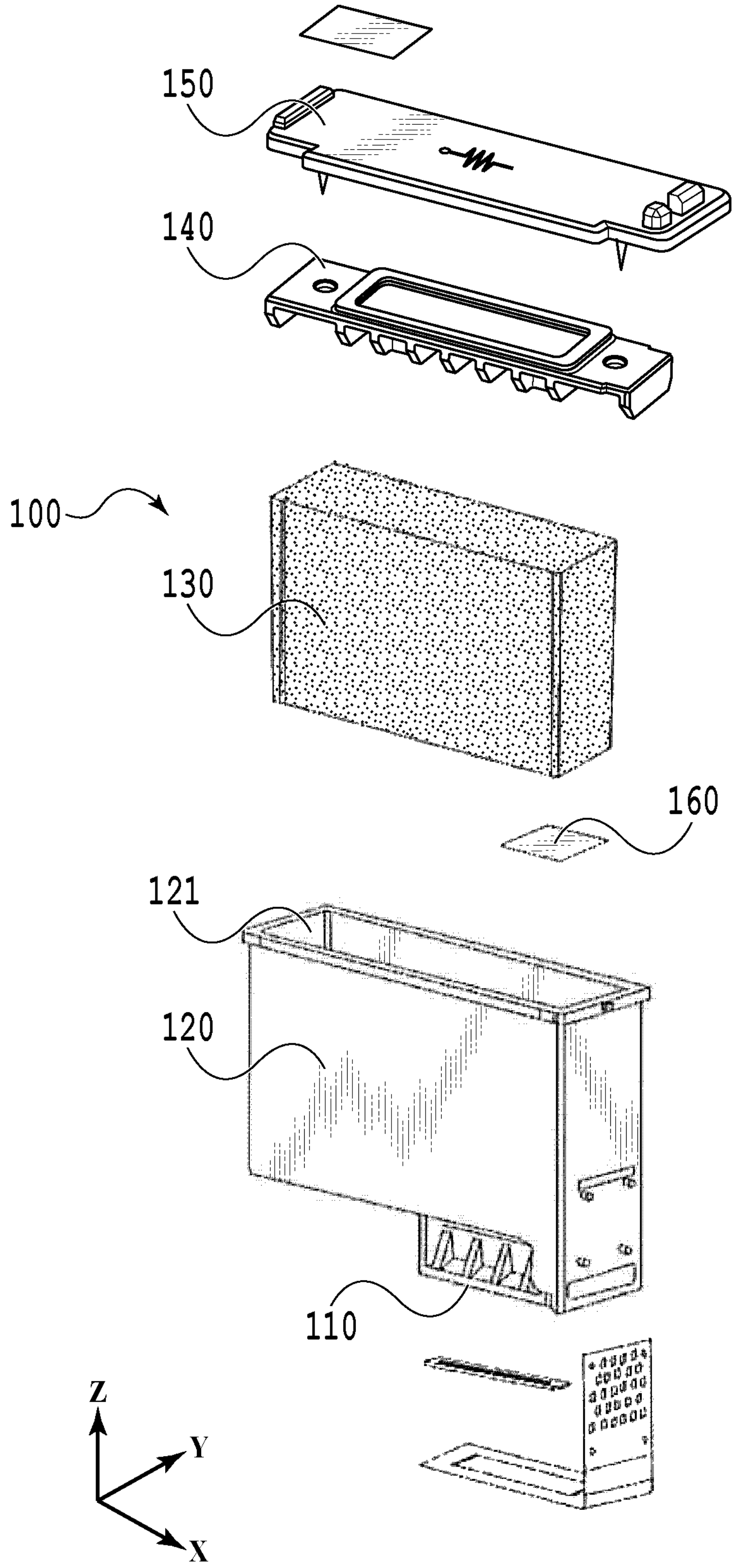
FIG. 3 is an exploded perspective view of the cartridge according to the first embodiment.

FIG. 2 illustrates a perspective view of the cartridge according to the first embodiment, and FIG. 3 illustrates an exploded perspective view of the cartridge according to the first embodiment. The cartridge 100 is a type that stores one color of ink therein, which is in general a cartridge for black ink. The present disclosure is also applicable to a type that stores multiple colors of ink, which is in general a cartridge for color ink (cyan, magenta, and yellow); however, in the present embodiment, the cartridge for black ink is used for the application of the present disclosure.

As illustrated in FIG. 3, the cartridge 100 includes a printing head 110 that ejects ink, a tank 120 that stores ink, an absorbent 130 that absorbs and holds liquid, a partition member 140 that presses the absorbent 130, and a lid member 150 that is joined with the tank 120. The cartridge 100 includes a filter 160 that removes a foreign substance in the tank 120. The printing head 110 has a configuration to eject the ink based on ejection data and is arranged on a bottom surface of the tank 120 in a downward vertical direction. The absorbent 130 is formed of a fiber material, a porous body, or the like and can hold the ink therein by the development of capillary force. The absorbent 130 is stored in an absorbent holder 121 of the tank 120 to be put in contact with the filter 160 that removes the foreign substance.

The lid member 150 is arranged to close an opening of the tank 120 and partitions the absorbent holder 121 with the tank 120. The partition member 140 is positioned between the absorbent 130 and the lid member 150 and fixes and holds the absorbent 130. Details of the lid member 150 and the partition member 140 are described later.

(Assembling Step)

FIG. 4 is a schematic cross-sectional view of the lid member 150 and the partition member 140 of the cartridge according to the first embodiment. FIG. 4A is a state before assembling of the lid member 150 and the partition member 140. As illustrated in FIG. 4A, the lid member 150 defines a plane in an XY plane and defines a first surface 152 and a second surface 154. The second surface 154 of the lid member 150 includes a welding rib 195 and protrusion portions 20, 22 protruding in a −Z axis direction. The lid member 150 is formed of thermally expandable material. In the first embodiment, the protrusion portions 20, 22 are away from each other at a distance of an interval A along an X axis. The welding rib 195 may be an independent part and is arranged between the lid member 150 and the tank 120 in a case of the vibration welding. Note that, the −Z axis direction corresponds to the direction of gravity.

Figure 4A:
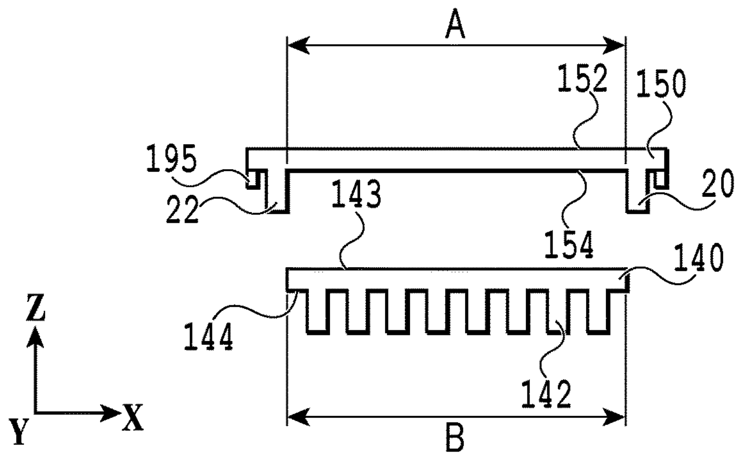
FIGS. 4A to 4D illustrate assembling steps of a lid member and a partition member according to the first embodiment.

The partition member 140 defines a plane in the XY plane, defines a first surface 143 and a second surface 144, and has a dimension B along the X axis. The second surface 144, which is the opposite surface of the first surface 143 of the partition member 140, includes a rib portion 142 protruding in the −Z axis direction. In FIG. 4A, the lid member 150 is at a normal temperature and is not thermally expanded. Since the interval A between the protrusion portions 20, 22<the dimension B of the partition member 140, the partition member 140 is not inserted between the protrusion portions 20, 22.

Figure 4B:
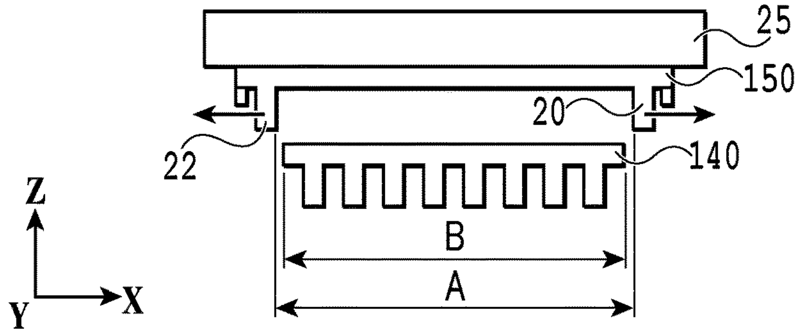
Figure 4C:
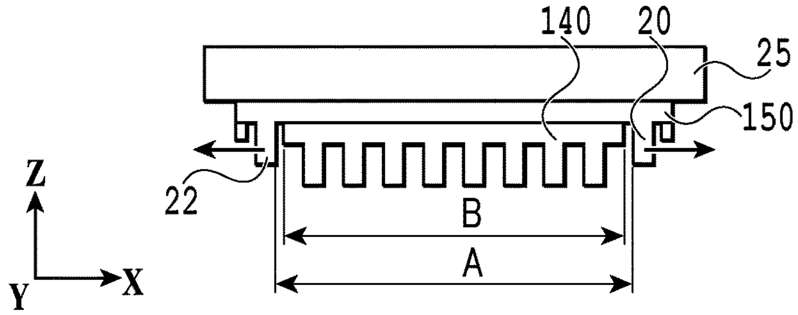
Figure 4D:
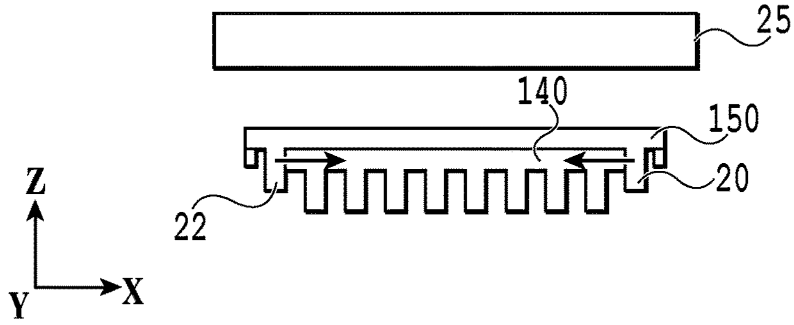

FIGS. 4B to 4D illustrate steps of assembling the lid member 150 and the partition member 140. The assembling is performed in the order of FIG. 4B, FIG. 4C, and FIG. 4D. As illustrated in FIG. 4B, a heat source 25 is put in contact with or adjacent to the lid member 150 to heat the lid member 150. The lid member 150 is thermally expanded, and the interval A between the protrusion portions 20, 22 is expanded. In the thermal expansion of the lid member 150, the interval A between the protrusion portions 20, 22>the dimension B of the partition member 140.

As illustrated in FIG. 4C, since the interval A between the protrusion portions 20, 22>the dimension B of the partition member 140, the partition member 140 is inserted between the protrusion portions 20, 22, and the partition member 140 is arranged between the protrusion portions 20, 22. As illustrated in FIG. 4D, the heat source 25 is moved away from the lid member 150, and the temperature of the lid member 150 is reduced. The lid member 150 is not thermally expanded, and the interval A between the protrusion portions 20, 22 is decreased. The partition member 140 is gripped by the protrusion portions 20, 22, and the lid member 150 and the partition member 140 are fixed.

(Vibration Welding Step)

Figures 5A, 5B, 5C:
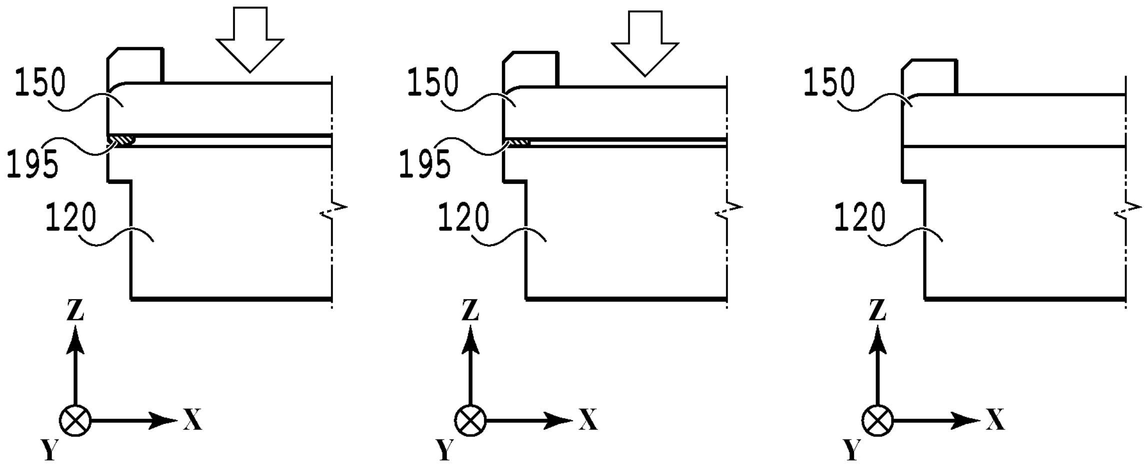
FIGS. 5A to 5C illustrate vibration welding steps of the lid member and a tank according to the first embodiment.

FIG. 5 illustrates a vibration welding step of the tank 120 and the lid member 150 fixed to the partition member 140. The lid member 150 is arranged on the opening portion of the tank 120, the welding rib 195 of the lid member 150 is put in contact with the opening portion of the tank 120, and the lid member 150 is vibrated while being pressed onto the tank 120 with a predetermined pressure. A vibration direction of the lid member 150 is an X axis direction of the lid member 150. An amplitude of the vibration is in a range of 0.5 mm or greater and 2.0 mm or smaller, and a frequency of the vibration is in a range of 200 Hz or greater and 400 Hz or smaller. The lid member 150 is vibrated with respect to the tank 120, frictional heat is generated in a contact portion between the tank 120 and the welding rib 195, and the opening portion of the tank 120 and the welding rib 195 are melted; thus, the tank 120 and the lid member 150 are coupled with each other.

(Separation Step)

The used cartridge 100 may be collected by a recycling agent and the like. The cartridge 100 is cleaned to remove stains of ink and the like, and multiple inspections are conducted on the quality. The tank 120 and the lid member 150 of the cartridge 100 that are determined as recyclable may be separated from each other, and the partition member 140 may be recycled.

Figure 6A:
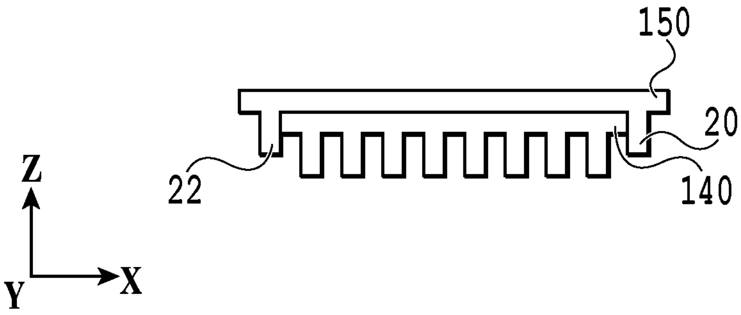
FIGS. 6A to 6C illustrate separation steps of the lid member and the partition member according to the first embodiment.
Figure 6B:
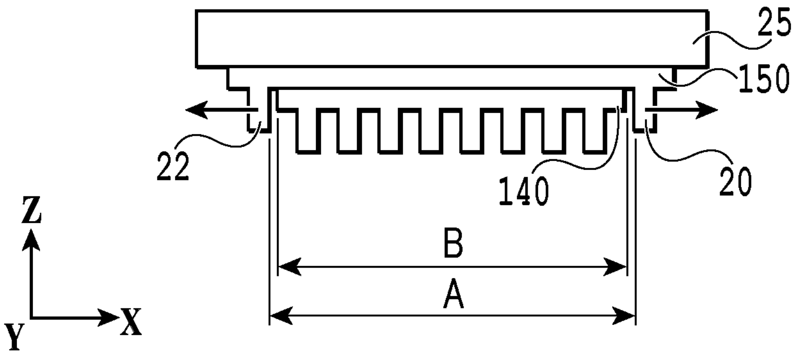
Figure 6C:
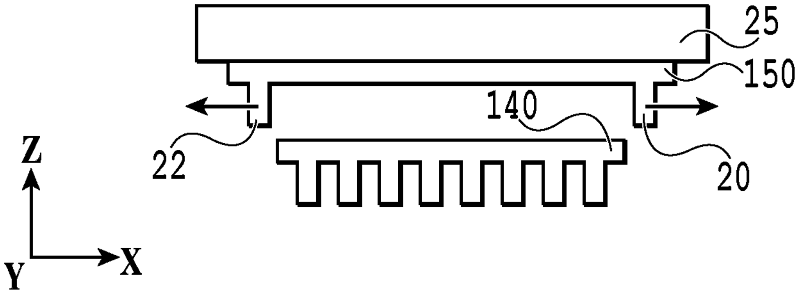

FIG. 6 illustrates a separation step of the lid member 150 and the partition member 140. FIG. 6A is a state before the lid member 150 and the partition member 140 are separated from each other. The lid member 150 is at a normal temperature and is not thermally expanded, and the protrusion portions 20, 22 grip the partition member 140; therefore, the lid member 150 and the partition member 140 cannot be separated from each other. FIGS. 6B and 6C illustrate the steps of separating the lid member 150 and the partition member 140 from each other. The separation is performed in the order of FIG. 6B and FIG. 6C. As illustrated in FIG. 6B, the lid member 150 is heated by the heat source 25. The lid member 150 is heated and thermally expanded, and the interval A between the protrusion portions 20, 22 is expanded. In this process, the interval A between the protrusion portions 20, 22>the dimension B of the partition member 140. As illustrated in FIG. 6C, the protrusion portions 20, 22 do not grip the partition member 140, and the lid member 150 and the partition member 140 are separated from each other. The heat source 25 is moved away from the lid member 150 after the separation, and thus the lid member 150 is cooled down and returns to the original shape.

(Recycling Method)

The separated partition member 140 is recycled to be assembled into a next product. A method of recycling the partition member 140 includes a step of detaching the lid member 150 from the tank 120, a step of separating the lid member 150 and the partition member 140 from each other, a step of replacing the absorbent 130, and a step of cleaning the inside of the tank 120. The method of recycling the partition member 140 also includes a step of inserting a new absorbent 130 into the tank 120 and injecting liquid, a step of fitting a new lid member 150 and the partition member 140 to each other, and a step of welding the new lid member 150 prepared and the tank 120 to each other. With such a method, the cartridge is manufactured and recycled. The number of the protrusion portions 20, 22 is not limited to two and may be one or three or more.

A displacement amount due to the thermal expansion is obtained by linear coefficient of expansion×temperature change amount×thermal expansion direction length. Therefore, a material of a lower linear coefficient of expansion than that of the lid member 150 or a material of a lower thermal conductivity than that of the lid member 150 is used for the partition member 140. In a normal temperature state, the partition member 140 forms a shape that achieves the interval A between the protrusion portions 20, 22<the dimension B of the partition member 140, and in a heating state, the partition member 140 forms a shape that achieves the interval A between the protrusion portions 20, 22>the dimension B of the partition member 140. Thus, the assembling and the disassembling of the lid member 150 and the partition member 140 are facilitated, and the recyclability is improved.

Modification of First Embodiment

Figure 7:
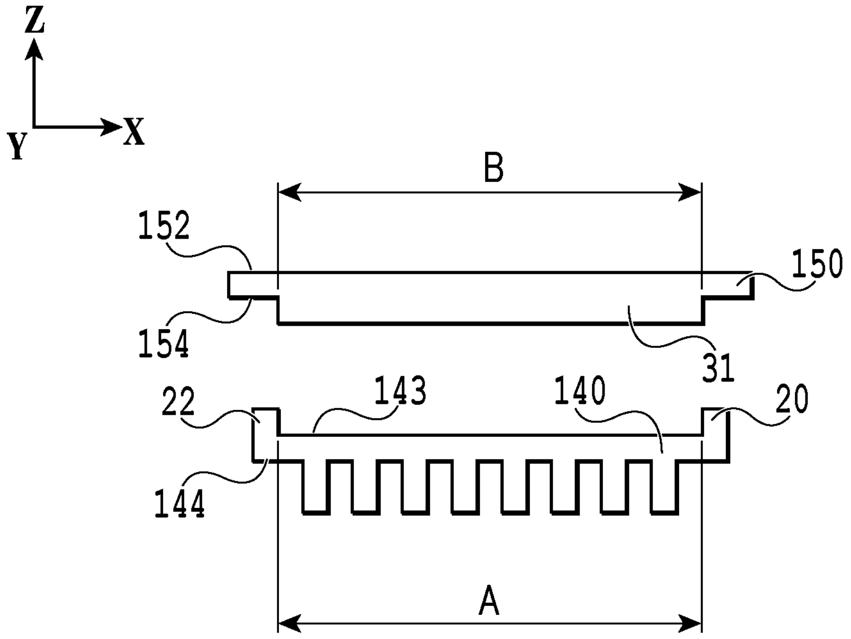
FIG. 7 illustrates the lid member and the partition member according to a modification of the first embodiment.

FIG. 7 illustrates the lid member 150 and the partition member 140 according to a modification of the first embodiment. As illustrated in FIG. 7, the first surface 143 of the partition member 140 includes the protrusion portions 20, 22, and the protrusion portions 20, 22 are away from each other at a distance of the interval A along the X axis. The second surface 154 of the lid member 150 includes a gripped portion 31, and the gripped portion 31 has the dimension B along the X axis. In this case, it is desirable to use a material of a lower linear coefficient of expansion than that of the partition member 140 or a material of a lower thermal conductivity than that of the partition member 140 for the lid member 150.

In the modification of the first embodiment, the partition member 140 is heated by a similar method as that of the first embodiment, the interval A between the protrusion portions 20, 22 is expanded, the gripped portion 31 of the lid member 150 is gripped by the protrusion portions 20, 22, and the lid member 150 and the partition member 140 are fixed.

Second Embodiment

Figure 8:
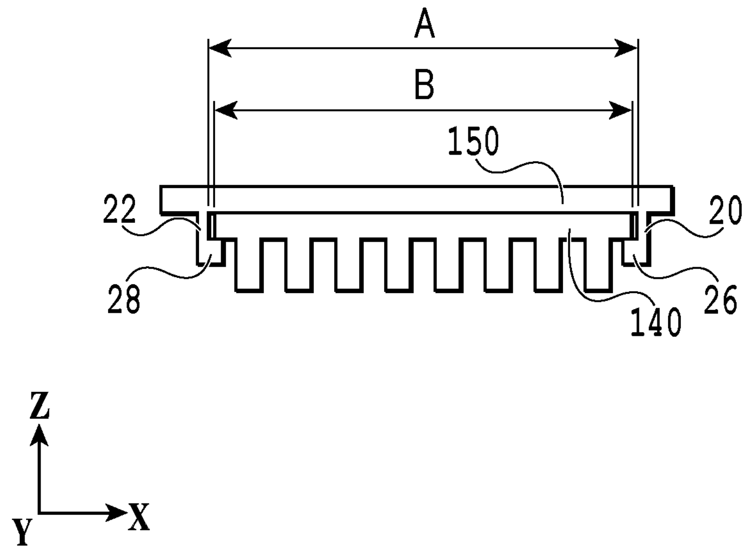
FIG. 8 illustrates the lid member and the partition member according to a second embodiment.

FIG. 8 illustrates the lid member 150 and the partition member 140 in a second embodiment. In the second embodiment, the protrusion portions 20, 22 include side portions 26, 28, respectively, and the side portions 26, 28 face each other along the X axis. In the assembling of the lid member 150 and the partition member 140, the side portions 26, 28 fix the partition member 140 in a Z direction.

In the second embodiment, the lid member 150 is heated by a similar method as that of the first embodiment, the interval A between the protrusion portions 20, 22 is expanded, the partition member 140 is gripped by the protrusion portions 20, 22 and the side portions 26, 28, and the lid member 150 and the partition member 140 are fixed. With such a configuration, it is possible to prevent the lid member 150 and the partition member 140 from falling off during conveyance of the apparatus, for example.

Third Embodiment

Figure 9:
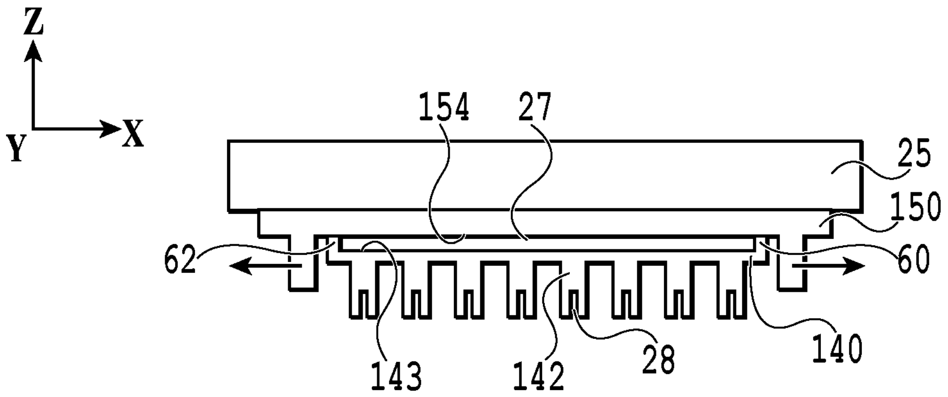
FIG. 9 illustrates the lid member and the partition member according to a third embodiment.

FIG. 9 illustrates the lid member 150 and the partition member 140 in a third embodiment. In the third embodiment, as illustrated in FIG. 9, the first surface 143 of the partition member 140 includes protrusions 60, 62. The protrusions 60, 62 define a contact reduction slit 27, and the contact reduction slit 27 reduces a contact area between the lid member 150 and the partition member 140 in the surface of the partition member 140 that faces the lid member 150. The rib portion 142 includes a heat dissipation slit 28 provided in a Z axis direction.

In the thermal expansion of the lid member 150 by heating, the contact reduction slit 27 reduces the contact area between the lid member 150 and the partition member 140 and suppresses the heating of the partition member 140. Additionally, the heat dissipation slit 28 dissipates the heat of the partition member 140 to the atmosphere and suppresses a temperature rise of the partition member 140. The thermal expansion of the partition member 140 is suppressed by the contact reduction slit 27 and the heat dissipation slit 28 and facilitates the assembling and the disassembling of the lid member 150 and the partition member 140. Alternatively, the protrusions 60, 62 may be provided to the second surface 154 of the lid member 150.

Fourth Embodiment

Figure 10A:
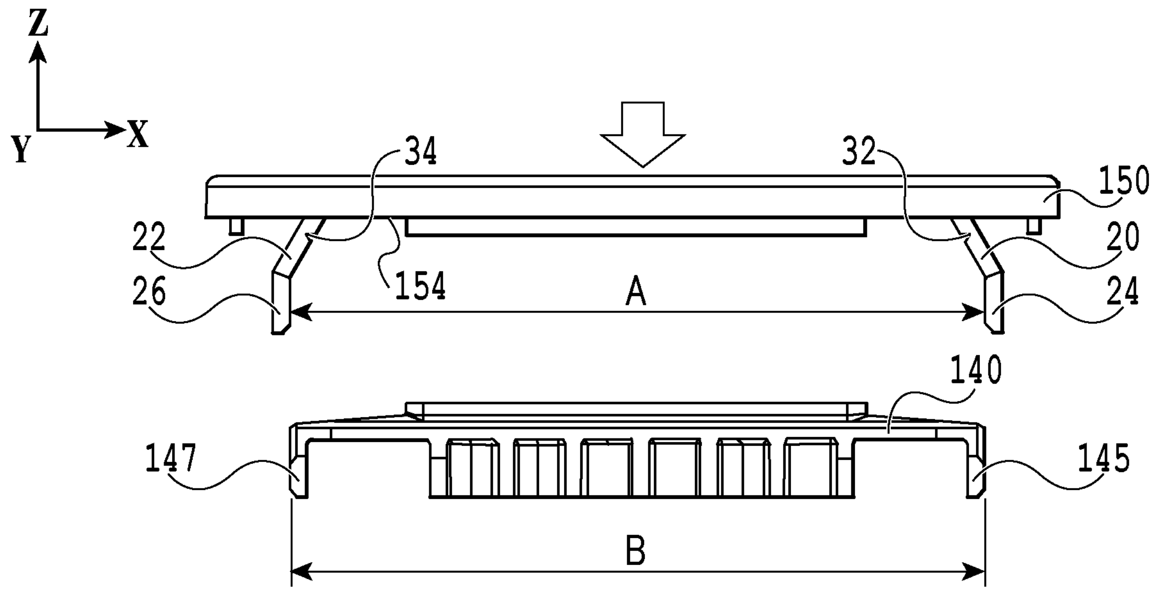
FIGS. 10A and 10B illustrate the lid member and the partition member according to a fourth embodiment.

FIG. 10 illustrates the lid member 150 and the partition member 140 in a fourth embodiment. As illustrated in FIG. 10A, in the fourth embodiment, the protrusion portions 20, 22 are inclined with respect to the second surface 154 of the lid member 150 and are away from each other in the form of a fan as they extend in the −Z direction. Portions of the protrusion portions 20, 22 that are proximal to the second surface 154 include grooves 32, 34, respectively, and the grooves 32, 34 face each other. The protrusion portions 20, 22 includes gripping portions 24, 26 protruding in the −Z direction. The gripping portions 24, 26 define the interval A along the X axis between the gripping portions 24, 26. Alternatively, at least one of the protrusion portions 20, 22 may include the groove.

In the fourth embodiment, the partition member 140 has the dimension B along the X axis. Side surfaces of the partition member 140 along a Y direction include gripped portions 145, 147 extending in the Z direction, respectively. The interval A between the gripping portions 24, 26<the dimension B of the partition member 140.

Figure 10B:
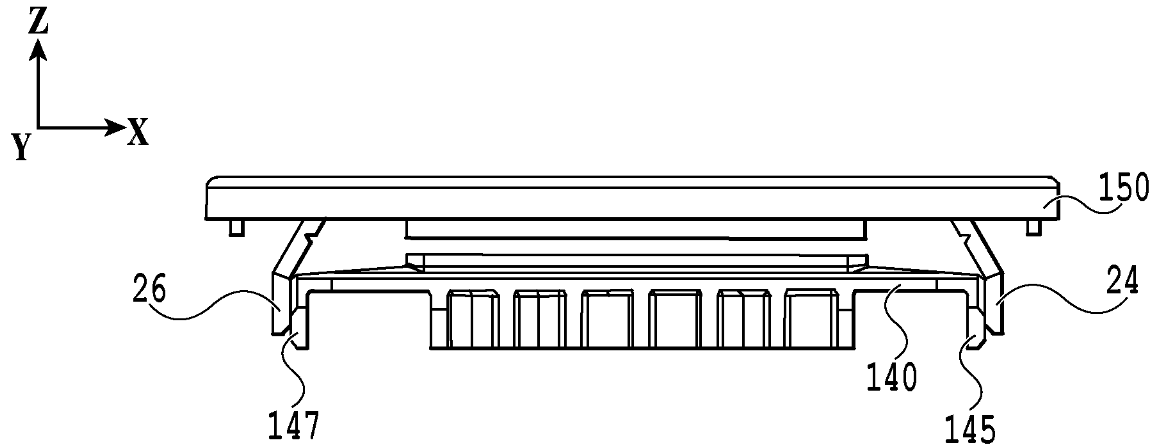

As illustrated in FIG. 10B, the partition member 140 is press-fitted between the gripping portions 24, 26 of the lid member 150, the gripping portions 24, 26 and the gripped portions 145, 147 are engaged with each other, and the lid member 150 and the partition member 140 are fixed. With such a configuration, it is possible to perform the assembling without using welding and adhering.

FIG. 11 illustrates an assembling step of the lid member 150 to which the partition member 140 is fixed and the tank 120 in the fourth embodiment. FIG. 11A is a state before the assembling of the lid member 150 and the tank 120. FIGS. 11B to 11E illustrate the steps of assembling the lid member 150 and the tank 120. The assembling is performed in the order of FIG. 11B, FIG. 11C, FIG. 11D, and FIG. 11E.

Figure 11A:
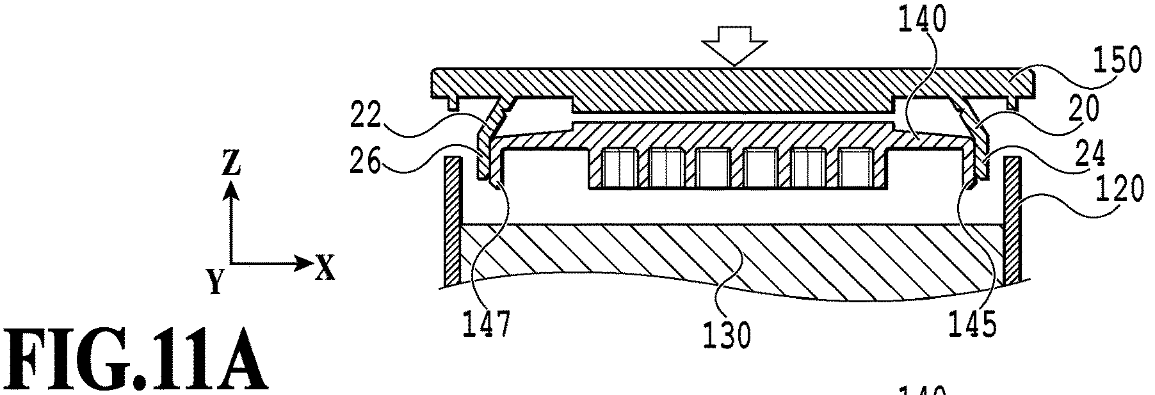
FIGS. 11A to 11E illustrate assembling steps of the lid member and the partition member according to the fourth embodiment.
Figure 11B:
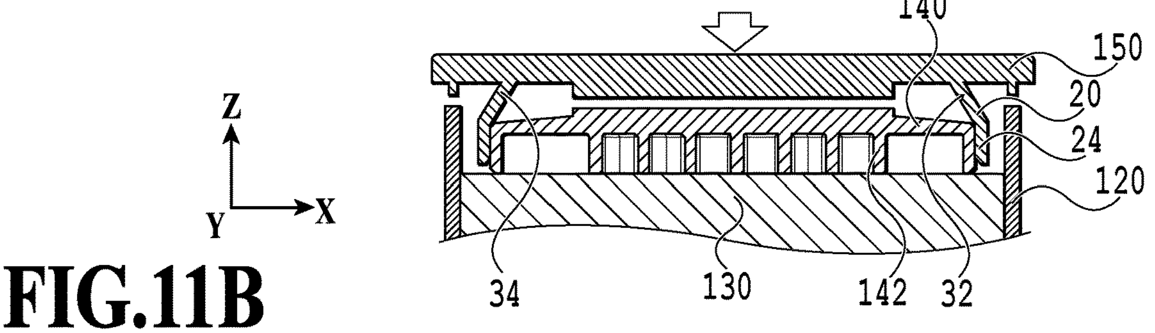
Figure 11C:
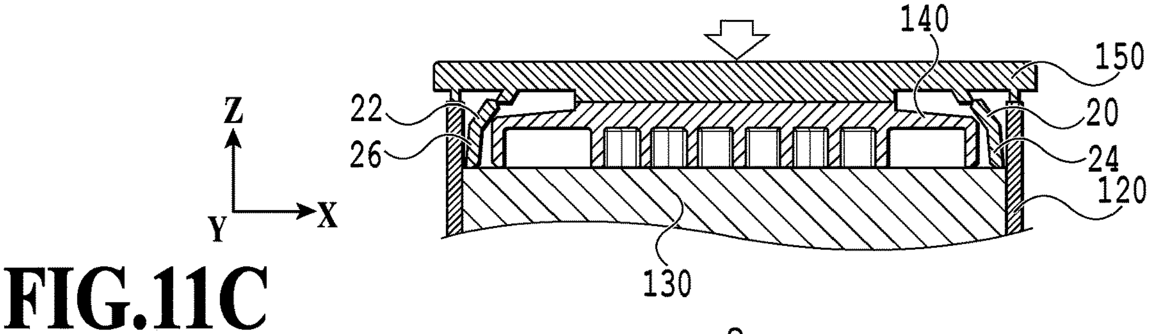
Figure 11D:
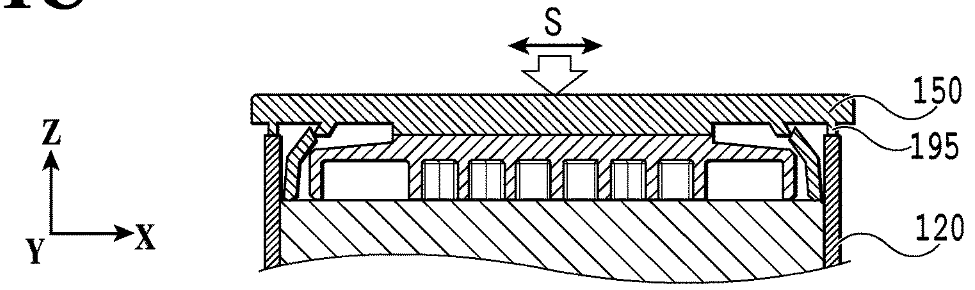

As illustrated in FIG. 11B, the lid member 150 is arranged on the opening of the tank 120, and the rib portion 142 of the partition member 140 is put in contact with the absorbent 130. As illustrated in FIG. 11C, with the partition member 140 further being pressed into the tank 120, the partition member 140 is pushed up by the absorbent 130, and a stress in the +Z axis direction is applied to the protrusion portions 20, 22 and the gripping portions 24, 26. Thus, a concentrated stress is generated in the grooves 32, 34 of the protrusion portions 20, 22, and the protrusion portions 20, 22 are broken at the grooves 32, 34 as a starting point. As illustrated in FIG. 11D, the vibration welding of the lid member 150 and the tank 120 is performed along a direction S.

Figure 11E:
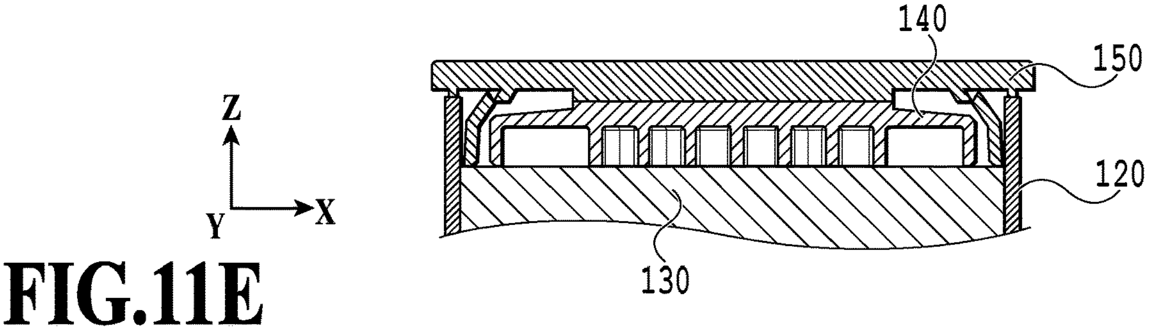

As illustrated in FIG. 11E, the lid member 150 and the tank 120 are fixed, and the partition member 140 and the lid member 150 are not fixed in the tank 120. The partition member 140 is held by the lid member 150 and the absorbent 130 in the tank 120; for this reason, the pressing of the absorbent 130 is not interfered even though the protrusion portions 20, 22 are broken. Since the protrusion portions 20, 22 are broken, the lid member 150 and the partition member 140 are already separated from each other in a case where the lid member 150 and the tank 120 are detached; therefore, the disassembling of the two parts is facilitated.

The used cartridge 100 may be collected by the recycling agent and the like. The cartridge 100 is cleaned to remove stains of ink and the like, and multiple inspections are conducted on the quality. The tank 120 and the lid member 150 of the cartridge 100 that are determined as recyclable may be separated from each other, and the partition member 140 may be recycled. With the configuration of the fourth embodiment, the partition member 140 is separated from the lid member 150 in a case where the lid member 150 and the tank 120 are separated from each other; therefore, it is possible to reduce the step of disassembling the lid member 150 and the partition member 140.

Fifth Embodiment

Figure 12A:
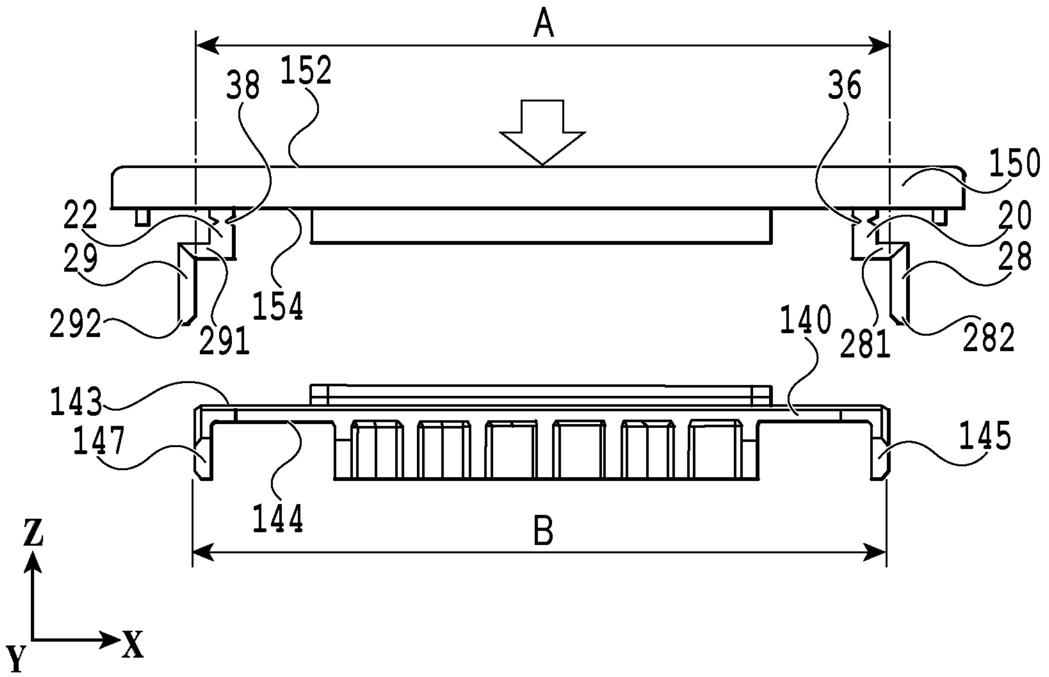
FIGS. 12A and 12B illustrate the lid member and the partition member according to a fifth embodiment.

FIG. 12 illustrates the lid member 150 and the partition member 140 in a fifth embodiment. As illustrated in FIG. 12A, the protrusion portions 20, 22 extend from the second surface 154 of the lid member 150 in the −Z direction. Portions of the protrusion portions 20, 22 that are proximal to the second surface 154 include grooves 36, 38 surrounding the protrusion portions 20, 22, respectively. Portions of the protrusion portions 20, 22 that are distal to the second surface 154 include gripping portions 28, 29.

The gripping portion 28 includes a first portion 281 extending in a direction away from the center of gravity of the lid member 150 along the X direction and a second portion 282 extending in the −Z direction from a distal portion of the first portion 281. The gripping portion 29 includes a first portion 291 extending in a direction away from the center of gravity of the lid member 150 along the X direction and a second portion 292 extending in the −Z direction from a distal portion of the first portion 291. The second portions 282, 292 define the interval A along the X axis.

In the fifth embodiment, the partition member 140 has the dimension B along the X axis. Side surfaces of the partition member 140 along the Y direction include the gripped portions 145, 147 extending in the Z direction, respectively. The interval A between the second portions 282, 292<the dimension B of the partition member 140.

Figure 12B:
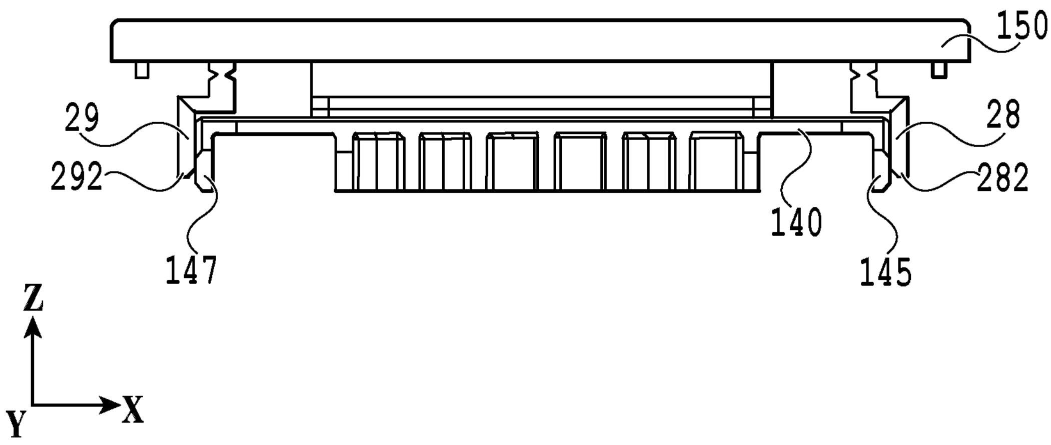
Figure 13A:
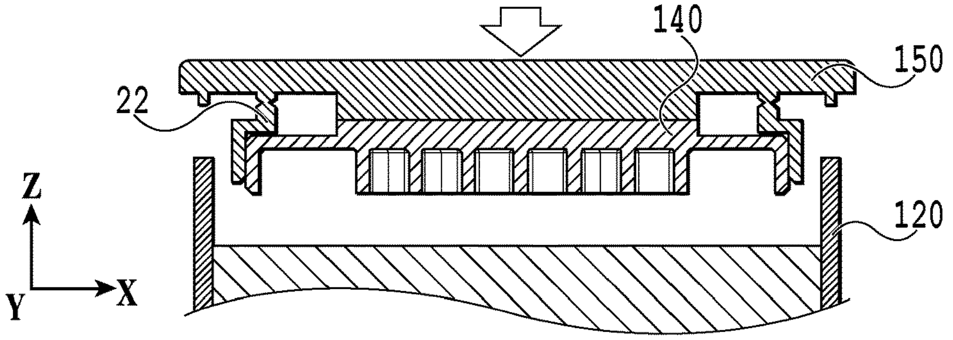
FIGS. 13A to 13D illustrate assembling steps of the lid member and the partition member according to the fifth embodiment.
Figure 13B:
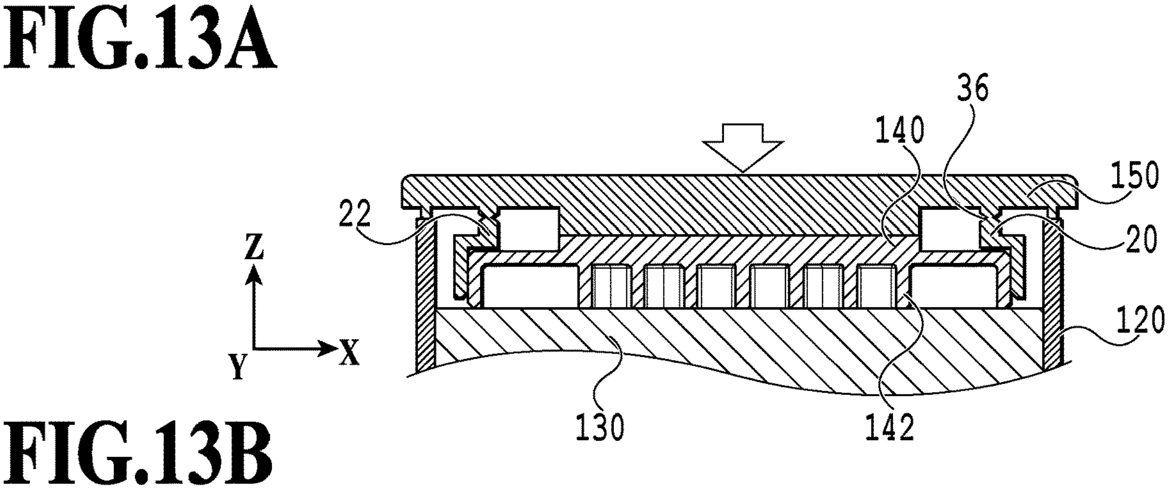
Figure 13C:
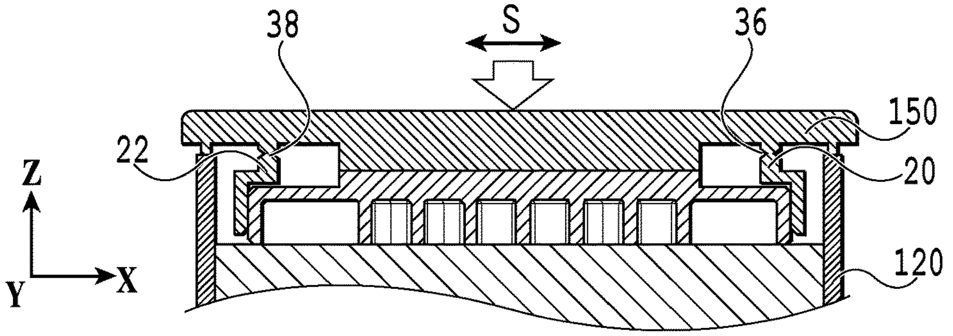
Figure 13D:
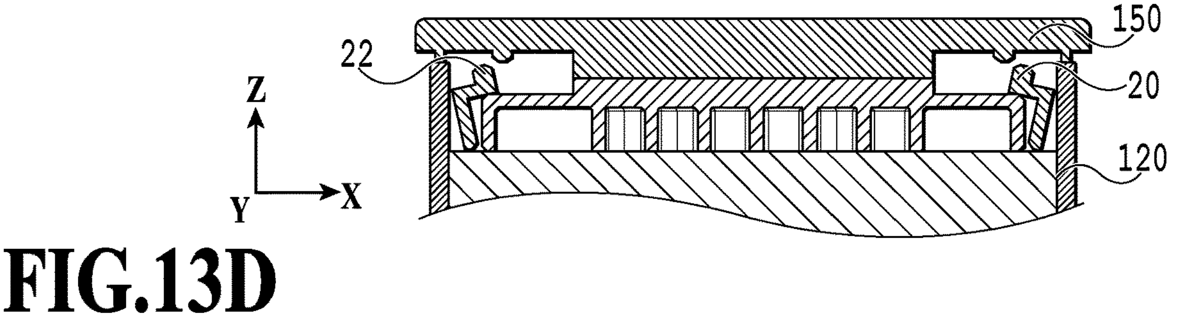

As illustrated in FIG. 12B, the partition member 140 is press-fitted between the gripping portions 28, 29 of the lid member 150, the second portions 282, 292 of the gripping portions 28, 29 and the gripped portions 145, 147 are engaged with each other, and the lid member 150 and the partition member 140 are fixed. Additionally, the first portions 281, 291 suppress the movement of the partition member 140 in the +Z axis direction. With such a configuration, it is possible to achieve the assembling at low cost without using welding and adhering.

FIG. 13 illustrates an assembling step of the lid member 150 to which the partition member 140 is fixed and the tank 120 in the fifth embodiment. FIG. 13A is a state before the assembling of the lid member 150 and the tank 120. FIGS. 13B to 13D illustrate the steps of assembling the lid member 150 and the tank 120. The assembling is performed in the order of FIG. 13B, FIG. 13C, and FIG. 13D. As illustrated in FIG. 13B, the lid member 150 is arranged on the opening of the tank 120, and the rib portion 142 of the partition member 140 is put in contact with the absorbent 130. As illustrated in FIG. 13C, with the vibration welding of the lid member 150 and the tank 120 being performed along the direction S, a stress concentration occurs in the grooves 36, 38 surrounding the protrusion portions 20, 22, and the protrusion portions 20, 22 are broken at the grooves 36, 38 as a starting point. As illustrated in FIG. 13D, the lid member 150 and the tank 120 are fixed, and the partition member 140 and the lid member 150 are not fixed in the tank 120.

The partition member 140 is held by the lid member 150 and the absorbent 130 in the tank 120; for this reason, the pressing of the absorbent 130 is not interfered even though the protrusion portions 20, 22 are broken. Since the protrusion portions 20, 22 are broken, the lid member 150 and the partition member 140 are already separated from each other in a case where the lid member 150 and the tank 120 are detached; therefore, the disassembling of the two parts is facilitated. The lid member may be a material that can be contracted by ultraviolet curing.

With the configuration of the fifth embodiment, the partition member 140 is already separated from the lid member 150 in a case where the lid member 150 and the tank 120 are separated from each other; therefore, it is possible to reduce the step of disassembling the lid member 150 and the partition member 140.

Although it is already described in the first embodiment, a reusing method is described again. The partition member 140 is separated and recycled to be assembled into a next product. The method of recycling the partition member 140 includes the step of detaching the lid member 150 from the tank 120, the step of separating the lid member 150 and the partition member 140 from each other, the step of replacing the absorbent 130, and the step of cleaning the inside of the tank 120. The method of recycling the partition member 140 also includes the step of inserting a new absorbent 130 into the tank 120 and injecting liquid, the step of fitting a new lid member 150 and the partition member 140 to each other, and the step of welding the new lid member 150 and the tank 120 to each other. With such a method, the cartridge is manufactured and recycled.

In any one of the embodiments, the shape of the partition member 140 is an elongated shape, and an aspect ratio that is a width-to-height ratio (in this case, a ratio between a length and a width) in the partition member 140 may be 1:4, which is preferably a transverse dimension of 15.2 mm, and a longitudinal dimension of 64 mm. The cartridge 100 of the present disclosure may be other than a head-integral type.

Recycling Method of First Embodiment

Figure 14:
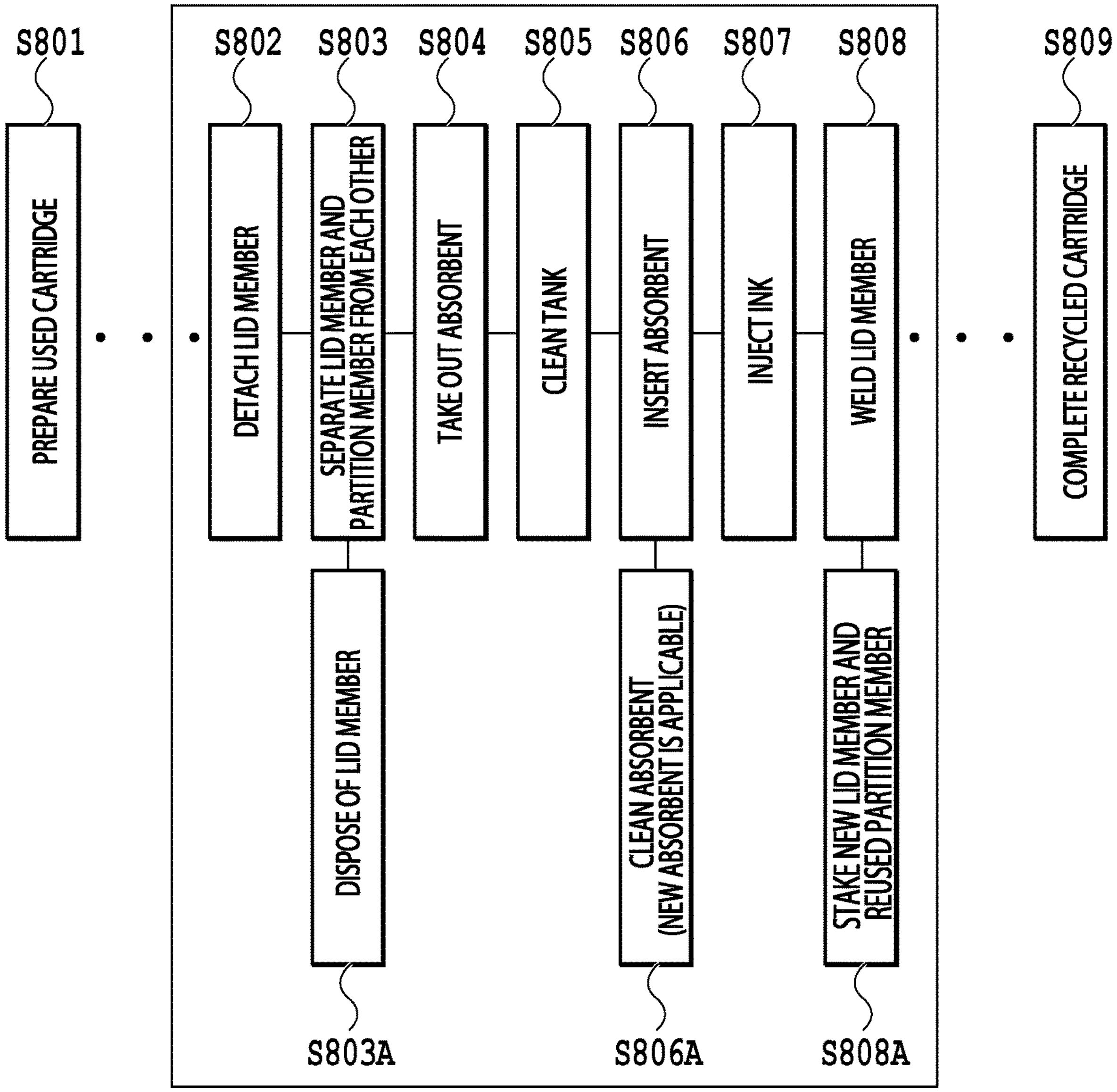
FIG. 14 is a flowchart illustrating a recycling step of the cartridge of the printing apparatus according to the first embodiment.

A recycling method of the cartridge of the first embodiment according to the present disclosure is described with reference to FIG. 14. The steps of recycling the cartridge of the first embodiment are from lid member detaching step S802 in which the lid member 150 is detached from the cartridge 100 and lid member welding step S808 in which the lid member 150 is welded; therefore, the steps are described in detail. FIG. 10 is the lid member detaching step to the lid member welding step extracted from a procedure of the cartridge recycling step.

First, the recycling step of the cartridge is started from step S801 in which the used cartridge 100 is prepared. Next, checking of the exterior of the cartridge, cleaning of the exterior, and so on are performed, and the process proceeds to the lid member detaching step S802 in which the lid member 150 is detached. In this step, the lid member 150 is moved relatively to the tank 120 to detach the lid member 150. Then, the process proceeds to lid member 150 and partition member 140 separation step S803. In the separation step S803, since the lid member 150 and the partition member 140 are integral with each other by staking, the lid member 150 and the partition member 140 are separated from each other. The fixation by the staking is fixation that allows for easy separation as described above. For this reason, it is possible to separate the partition member 140 from the lid member 150 by relative detaching. The separated lid member 150 is disposed of, and the partition member 140 is recycled. Then, the process proceeds to absorbent taking-out step S804, and the absorbent 130 in which the ink is depleted is taken out of the tank 120. Thereafter, the process proceeds to tank cleaning step S805.

In the tank cleaning step S805, the inside of the tank 120 is cleaned. Then, the process proceeds to absorbent insertion step S806. In the absorbent insertion step S806, a cleaned absorbent (S806A) that is obtained by cleaning the absorbent 130 taken out in the absorbent taking-out step S804 may be inserted in the tank 120. Alternatively, in the absorbent insertion step S806, a new absorbent may be inserted in the tank. In the absorbent cleaning step S806A, the absorbent 130 does not only absorb and drain a cleanser by filled from one direction, and the whole absorbent 130 is immersed in the cleanser to be impregnated with and cleaned by the cleanser completely. Additionally, it is also possible to perform the cleaning by pressing and deforming the absorbent 130 in the cleanser; therefore, it is possible to remove the remaining ink completely. After the absorbent insertion step S806, the process proceeds to ink injection step S807, and the ink is injected in the tank 120 while impregnating the ink into the absorbent 130 with an injection needle and the like. Then, before the process proceeds to the lid member welding step S808, as described above, in order to improve the handleability, step S808A in which heat staking is performed on the lid member 150 and the partition member 140 is performed. In the staking step S808A, anew lid member 150 is used, and the partition member 140 that is the one separated in the separation step S803 is used for the heat staking. The heat staking in this step also takes into consideration the recycling in the future, and the staking that allows for easy detaching with hands is applied. The lid member 150 and the partition member 140 integral with each other are arranged on the absorbent 130, and the lid member welding step S808 is performed. Since the lid member 150 is new, it is possible to achieve the welding that secures tight sealing. The subsequent steps are printing inspection, packaging, and so on, and finally the process proceeds to completion of recycled cartridge S809.

In a case of the cartridge for black ink in the present embodiments described above, a weight of the lid member 150 in the entire weight of the cartridge without the ink is about 13%, and a weight of the partition member 140 therein is about 11%. In a case where the lid member 150 is disposed of, and the partition member 140 is recycled, the recycling rate is about 87%. In a case of a lid of a type in a comparative example in which the lid member 150 and the partition member 140 are integral with each other, the weight of the lid is about 19%; accordingly, in a case where the lid is disposed of, the recycling rate is 81%. Since the lid member 150 is a substantially flat plate-shaped part, it is possible to reduce the weight of the part that needs to be disposed of as much as possible, and it is possible to improve the recycling rate more than that of the lid of the comparative example.

Figure 15B:
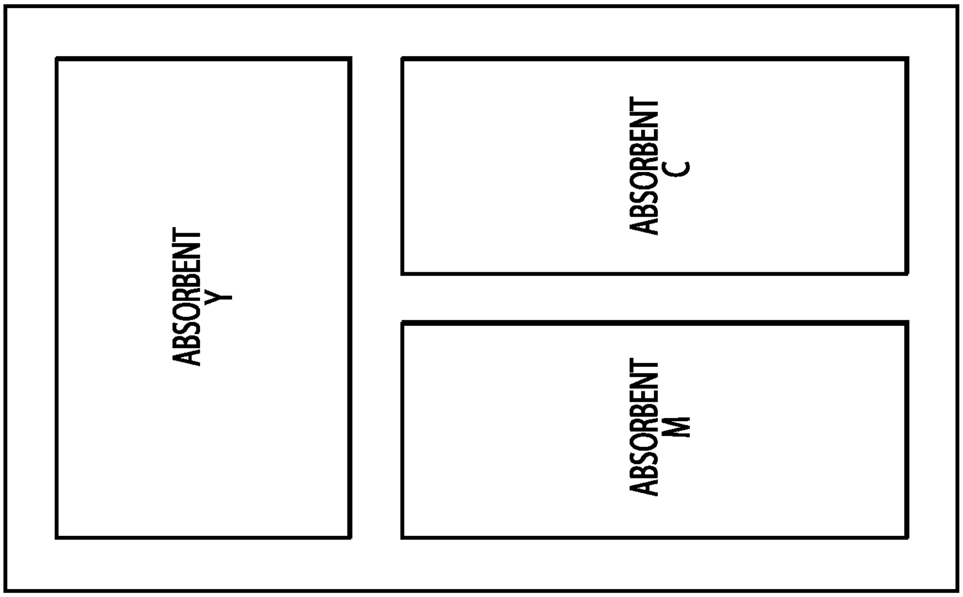
FIGS. 15A and 15B are an exemplary diagram of an ink tank in a different shape.
Figure 15A:
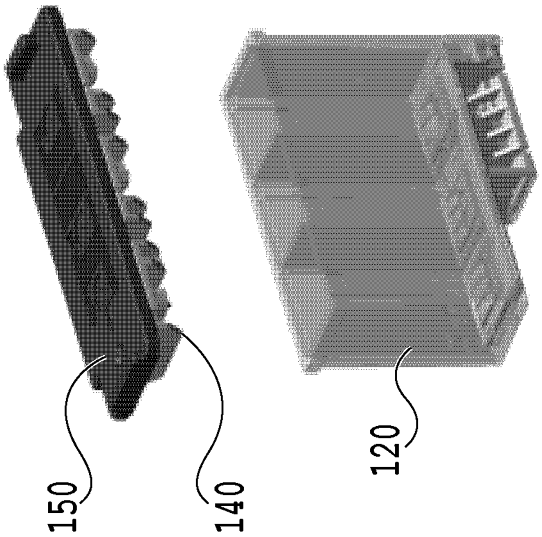

A structure, a fixation method, a separation method, and a recycling method of the lid member 150 and the partition member 140 in the embodiments of the present disclosure are applicable to any shape of the tank 120. For instance, the structure, the fixation method, the separation method, and the recycling method of the present disclosure are applicable to a cartridge having a configuration illustrated in FIG. 15A in which the tank 120 includes multiple absorbent holders. Additionally, the structure, the fixation method, the separation method, and the recycling method of the present disclosure are also applicable to a configuration illustrated in FIG. 15B in which the tank 120 is divided into three by a T-shaped wall along the Z axis direction, and the absorbent is arranged in a part of the absorbent holder.

The technologies described in this specification have the potential to contribute to the achievement of a sustainable society, such as a decarbonized society/circular society.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-066450, filed Apr. 14, 2023, and No. 2024-034595, filed Mar. 7, 2024, which are hereby incorporated by reference wherein in their entirety.

What is claimed is:

1. A cartridge, comprising:

a liquid absorbent that holds liquid;

a tank that includes an opening and an absorbent holder to store the liquid absorbent;

a lid member that is joined to the opening of the tank; and a partition member that is arranged between the liquid absorbent positioned inside the absorbent holder and the lid member, wherein the lid member includes a plurality of protrusion portions, the plurality of protrusion portions includes gripping portions, respectively, and the partition member is gripped by the gripping portions, and wherein the plurality of protrusion portions are inclined with respect to the lid member, the plurality of protrusion portions are arranged away from each other as they extend from the lid member, and at least one of the plurality of protrusion portions includes a groove.

2. The cartridge according to claim 1, wherein the lid member is a material that can be contracted by ultraviolet curing.

3. The cartridge according to claim 2, wherein the partition member includes a gripped portion corresponding to each of the gripping portions.

4. A cartridge, comprising:

a liquid absorbent that holds liquid;

a tank that includes an opening and an absorbent holder to store the liquid absorbent;

a lid member that is joined to the opening of the tank; and a partition member that is arranged between the liquid absorbent positioned inside the absorbent holder and the lid member, wherein the lid member includes a plurality of protrusion portions, the plurality of protrusion portions includes gripping portions, respectively, and the partition member is gripped by the gripping portions, wherein the plurality of protrusion portions extend in a direction away from the lid member, and includes grooves surrounding the plurality of protrusion portions, respectively, wherein each of the gripping portions includes a first portion extending in a direction away from a center of gravity of the lid member and a second portion extending in a direction away from the lid member from a portion of the first portion that is away from the center of gravity of the lid member, wherein the partition member includes a gripped portion corresponding to each of the gripping portions, and wherein the lid member is a material that can be contracted by ultraviolet curing.

5. A cartridge, comprising:

a liquid absorbent that holds liquid;

a tank that includes an opening and an absorbent holder to store the liquid absorbent;

a lid member that is joined to the opening of the tank; and a partition member that is arranged between the liquid absorbent positioned inside the absorbent holder and the lid member, wherein the lid member includes a plurality of protrusion portions, the plurality of protrusion portions includes gripping portions, respectively, and the partition member is gripped by the gripping portions, and wherein the plurality of protrusion portions extend in a direction away from the lid member, and includes grooves surrounding the plurality of protrusion portions, respectively, wherein each of the gripping portions includes a first portion extending in a direction away from a center of gravity of the lid member and a second portion extending in a direction away from the lid member from a portion of the first portion that is away from the center of gravity of the lid member, and wherein the partition member includes a gripped portion corresponding to each of the gripping portions, and wherein the lid member is a material that can be contracted by ultraviolet curing.

* * * * *